United States Patent Office 3,312,498
Patented Apr. 4, 1967

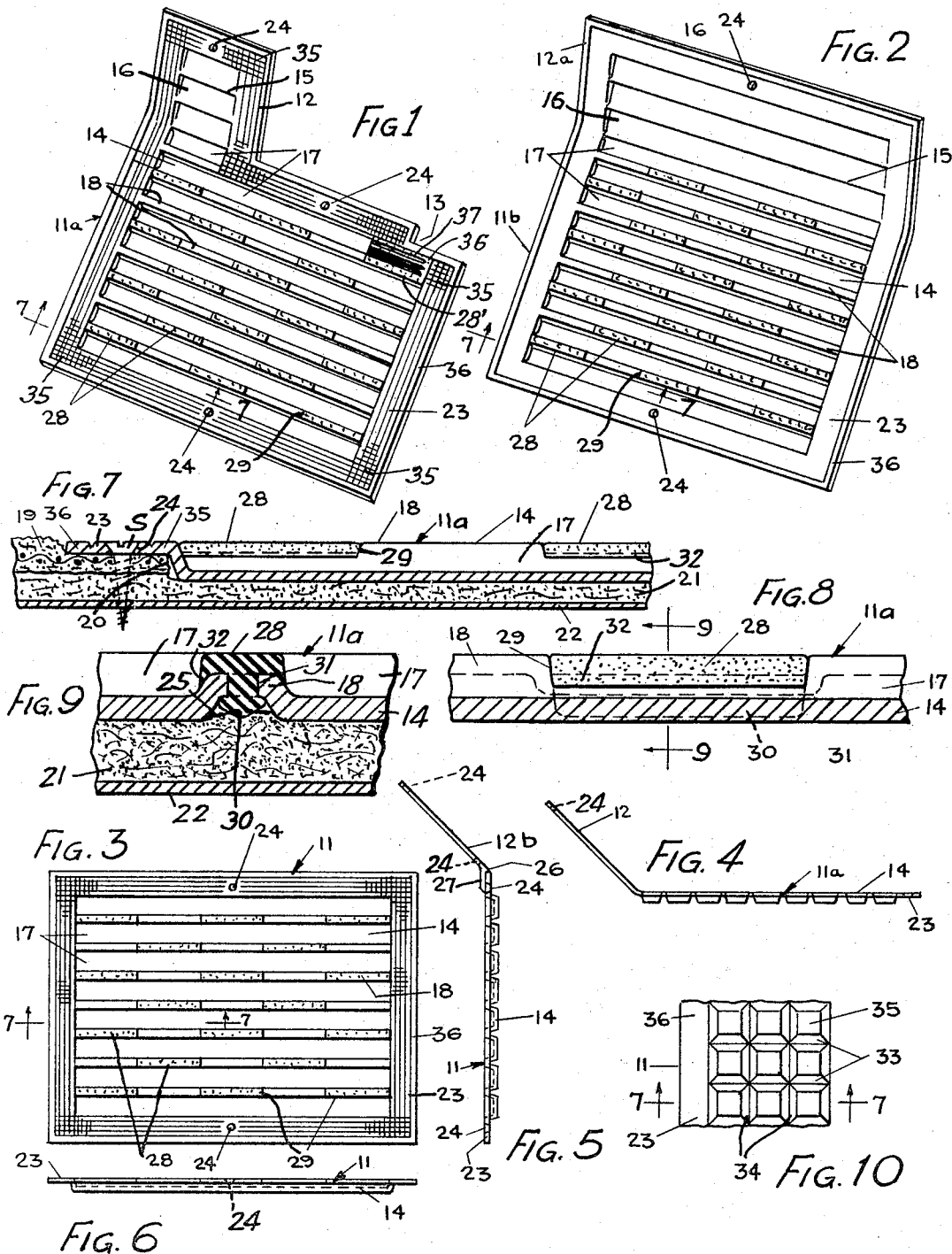

3,312,498
FLOOR GRATINGS AND ACCOMPANYING
DIRT AND WATER RECEPTACLES FOR
MOTOR VEHICLES
Stanley S. Stata, 301 Longwood St.,
Rockford, Ill. 61107
Filed Dec. 14, 1964, Ser. No. 417,888
11 Claims. (Cl. 296—1)

This invention relates to floor gratings and accompanying dirt and water receptacles for motor vehicles, and is more particularly concerned with improvements on the construction disclosed in my Patents 3,082,032 and 3,149,875, issued Mar. 19, 1963 and Sept. 24, 1964, respectively.

The principal object of my invention is to provide, in the form of a one-piece casting or sheet metal stamping, a metal floor grating having spaced parallel scraping ribs formed integral with the bottom of a shallow generally rectangular pan set in a recess in the floor carpeting and designed to collect moisture and dirt, retaining the moisture during evaporation thereof while leaving the top surfaces of the ribs fairly dry, the pan having a marginally projecting flange in which are provided holes in at least diametrically opposite sides of the pan to receive screws or other means of fastening the unit to the metal floor of the vehicle, only enough of the carpet being cut out to accommodate the pan while leaving the sound deadening jute for the pan to rest on and serve as a sound deadener between it and the metal floor under it, the flange resting on the carpet compressing it and the jute thereunder in the fastening of the unit to the floor sufficiently to lie substantially flush with the rest of the carpet so dirt can be easily swept off the carpet into the pan. The pans can easily be cleared of dirt at intervals with a vacuum cleaner, so that these floor gratings make for cleanliness in motor vehicles, besides greatly improving the appearance of the car's interior and eliminating the inevitable eyesore condition that results when the carpeting becomes worn at certain spots. Existing cars with badly worn spots in the carpeting can be fitted with these gratings and made to look like new. These gratings for rear seat use will be in one piece but those for front seat use may be of one-piece or two-piece construction, that portion that extends upwardly on the toeboard being either made integral with the rest of the unit or provided in a separate part made to fit and overlap the front edge portion of the floor unit, such as is used for rear seat installation, thereby reducing costs and making for much greater flexibility all around, because some customers might prefer to utilize the flat units for both front and back seat use, and some might start out with that type of grating for use in connection with the front seats and decide later to add the toeboard section. The latter is designed thin enough to overlie the toeboard carpet.

Another object of the invention, designed to enhance the appearance of the gratings, while adding non-skid protection, is to make the ribs hollow and provide molded rubber or resilient plastic scraper cleats fitting the tops of the hollow ribs and having anchoring lugs integral therewith insertable with a water-tight fit through slots provided in the top walls of the ribs, these non-metallic cleats giving in addition to the desired added non-skid protection, a sound deadening effect and also improving the appearance of the unit as a whole. The cleats are preferably set in recessed portions of the ribs so that the tops of the cleats lie substantially flush with the tops of the ribs, but the cleats are preferably made channel-shaped in cross-section so as to provide downwardly projecting flanges along the front and back of each cleat engaging the front and back walls of the rib for improved appearance and better drainage of dirt and water into the pan and also better support of the cleats on the ribs. The staggered arrangement of the cleats in neighboring ribs makes for improved non-skid protection and adds greatly to the appearance of each unit as a whole.

The invention is illustrated in the accompanying drawing in which—

FIGS. 1 and 2 are perspective views of floor gratings for front seat use, the grating of FIG. 1 being for the driver's side and that of FIG. 2 for the front seat passenger, both units having the anti-skid cleats in the floor engaging portion thereof disposed in staggered relationship in neighboring ribs;

FIG. 3 is a plan view of a similar floor grating designed primarily for rear seat use, but also suitable for front seat use, as shown in FIG. 5;

FIG. 4 is a side view of the floor grating of FIG. 1 taken from the left-hand edge, this view corresponding to a side view also of the grating of FIG. 2 from the left-hand edge;

FIG. 5 is a side view of the grating of FIG. 3 but illustrating how a separate toeboard section may be overlapped and interfitted with the floor grating like that of FIG. 3 for front seat use, the toeboard section corresponding otherwise to the toeboard section of the grating of FIG. 2 or the toeboard section of the grating of FIG. 1, depending, of course, on whether the assembly is intended for the front seat passenger or the driver;

FIG. 6 is a rear view of the grating shown in FIG. 3;

FIG. 7 is a sectional detail on the line 7—7 of FIGS. 1, 2 and 3, illustrating how the floor grating is supported partly on the jute under the carpet and partly on the carpet itself, compressing both when fastened to the metal floor by means of sheet metal screws;

FIG. 8 is an enlargement of a portion of FIG. 7;

FIG. 9 is a section on the line 9—9 of FIG. 8, and

FIG. 10 is an enlarged elevational detail of the anti-skid and ornamental pattern on the exposed face of the flanges of the gratings of FIGS. 1, 2 and 3 and shown in section on the left-hand portion of FIG. 7, as indicated by the section line 7—7 in FIG. 10.

Similar reference numerals are applied to corresponding parts in these views.

Referring to the drawing, the reference numeral 11 designates generally a rectangular floor grating of my invention in FIGS. 3, 5 and 6, which is usually employed only for rear seat use in an automobile but adapted also to be used in front seat installations where the purchaser is not interested in having a toeboard extension like that shown at 12 in FIG. 1 on the floor grating 11a designed for use in the driver's position, that grating having a notched corner portion 13 to provide clearance for the accelerator pedal, as required in some cars. The grating 11b shown in FIG. 2 has a full-length toeboard section 12a, this grating being designed for front seat use at the passenger's side. The toeboard portions 12 and 12a are designed for shoe scraping and to drain moisture therefrom into the generally rectangular recessed pan portion 14, the same having spaced parallel shoe scraping ribs 15 thereon with the troughs 16 therebetween designed to drain readily, as shown in FIGS. 1 and 2. Hence, whatever moisture is present will be collected in the troughs 17 of the pan 14 between the spaced parallel scraping ribs 18 that are cast or stamped integral with the pan 14, the dirt and water scraped off being collected in the pan, so that the tops of the ribs 18 always remain fairly dry. The water is evaporated fairly quickly and the dirt can be cleared out at intervals with a vacuum cleaner to keep the car tidy. In fact, these pans can have dirt swept into them from the surrounding carpet 19 to keep the entire interior of the car in a much tidier fashion than has been possible heretofore without these floor gratings. The floor gratings, being of cast or stamped sheet metal construction, are quite durable. Existing cars having badly worn spots in the carpeting can be fitted with these gratings and made to look like new. To install the grating, one need only cut a rectangular hole in the carpet 19 large enough to accommodate the pan portion 14, as indicated at 20 in FIG. 7, the pan 14 then resting on the jute 21 that covers the metallic floor 22 of the car and serves as a sound deadener between the pan and floor, while the marginal flange 23 rests on the carpet 19, and, when the grating is fastened to the floor 22 by means of two or more sheet metal screws S entered in holes 24 provided therefor in flange 23, the carpet 19 and jute 21 are thereby compressed, so that the flange 23 lies substantially flush with the surrounding carpet, as shown in FIG. 7, making it easy to sweep dirt off the carpet into the pan. At the same time, the jute 21 welling up inside the hollow ribs 18, as seen at 25 in FIG. 9, serves to resist any tendency toward lateral displacement of the grating from its set position, even if there are only two screws used on diametrically opposite sides of the unit, as indicated by the two screw holes 24 in FIGS. 2 and 3, a third screw hole 24 being shown on the toeboard 12 in FIG. 1. In passing, instead of having the toeboard portion 12 or 12a cast or stamped integral with the rest of the grating, as shown in FIGS. 1 and 2, I may provide the toeboard grating portion as a separate panel 12b, as shown in FIG. 5, but provided with ribs 15 and quick draining troughs 16 therebetween the same as on the toeboard portion 12 in FIG. 1, or 12a in FIG. 2, this panel 12b being fastened by means of screws S entered in screw holes 24 provided in opposite ends thereof when the shoulder 26 for locating the panel 12b has been placed in abutment with the front edge of the neighboring grating 11 and the projecting marginal flange portion 27 has been placed in overlapping relation to the front edge portion of the grating 11 for good drainage from grating panel 12b into grating 11. The toeboard parts 12, 12a and 12b, being so thin in relation to the pans 14, are laid on top of the carpet on the toeboard portion of the floor of the car and fastened to the floor by screws S as indicated above.

Partly for non-skid protection and partly for enhanced appearance of the unit as a whole I provide molded rubber or resilient plastic scraper cleats 28 of rectangular form set in recesses 29 provided therefor in the ribs 18, these recesses 29 being provided in staggered relationship in the neighboring ribs to give better anti-skid protection and also improve the general appearance with the checkerboard pattern thus produced. The ribs 18 are hollow, as best appears in FIGS. 8 and 9, and the cleats 28 extend lengthwise of the ribs and have elongated T-shaped lugs 30 molded integral with the bottoms thereof and entered with a water-tight fit in elongated slots 31 provided lengthwise of the recessed portions 29 of the ribs to anchor the cleats firmly in place as best seen in FIG. 9. The cleats have their top surfaces substantially flush with the tops of the ribs 18, and there are downwardly projecting flanges 32 along the front and back of each cleat to engage the front and back walls of the recessed portion of the ribs for improved appearance and better drainage therefrom into the pan and also better support of the cleats on the ribs.

Partly for increased non-skid protection and partly to enhance the appearance of the unit as a whole, I provide on the flanges 23 a waffleiron-like pattern of evenly spaced grooves 33 extending in one direction and evenly spaced parallel grooves 34 extending in right angle relationship thereto so as to define the small square top surfaces 35 in evenly spaced relation in the top surfaces of the flanges 23, leaving only a narrow band 36 along the outer edges of these flanges, so that any moisture scraped off the bottoms of shoes cannot run off the outer edges onto the carpet but will be drained into the pan 14 through grooves 33 and 34.

In conclusion, attention is called in FIG. 1 to the heel rest pad 36 molded of rubber or plastic material like the cleats 28 disposed directly behind the notched corner 13 to serve as a non-skid support for the heel of the driver's right shoe while operating the accelerator pedal. As also disclosed in my copending application, Ser. No. 416,870 filed Dec. 8, 1964, the pad 36 is molded integral with the adjacent cleat 28' so as to be secured in place with it by the cleat's lug 30 entered in the slot 31 in the front rib 18, the pad having its top surface flush with the top of the cleat and being of generally rectangular shape and having a press fit in one end of the front trough 17 of pan 14. The longitudinally extending grooves 37 in the top surface of pad 36 provide anti-slip action and open into the trough 17 at their inner ends so that any moisture getting into these grooves will drain into the trough 17. A pad like this one can also be used in the front right corner of grating 11 of FIG. 3 where it is used in the driver's position, with or without a notch 13 in this corner. Toeboards 12b can be available in the full width of gratings like the one 11 of FIG. 3, and also in a slightly narrower width, only as wide as the front portion of pan 14 in FIG. 1 to the left of notch 13, the full width toeboard being used at the front seat passenger's position, and the narrower one at the driver's position.

The operation should be clear from the foregoing description. In scraping dirt, water or snow off the shoes, the scraping action is performed partly by the ribs 18 and partly by the cleats 28. Whatever water is collected in the pan 14 in the troughs 17 between the ribs is soon evaporated, but, even before that occurs, the tops of the ribs 18 and cleats 28 are fairly dry. The dirt scraped off shoes or swept into the pans 14 from the surrounding carpet can be cleared out from time to time with a vacuum cleaner. As stated before, the non-metallic cleats 28 not only afford good anti-skid protection but add considerably to the nice appearance of the unit as a whole. Thus, I retain the advantages of metallic construction without any of its disadvantages. The metallic pans 14 are extremely durable. If the cleats 28 and/or heel pad 36 become worn enough to warrant it they may be replaced at a low cost. The rubber or plastic cleats 28 and pad 36 provide a pleasing contrast to the polished top surfaces of the metallic ribs 18, and, of course, these molded rubber or plastic parts can be made available in a variety of solid or mixed colors to match or contrast nicely to the upholstering in a car and thereby further improve the appearance and appeal to the most fastidious taste. The gratings can be made available in the three models shown in FIGS. 1, 2 and 3, but, as explained above, I may have only the one model of FIG. 3 available, using on occasion, the additional toeboard sections 12b, for the front seats where the purchaser wants to have the toeboard covered to the extent shown at 12 in FIG. 1 and 12a in FIG. 2.

It is believed the foregoing description conveys a good understanding of the objects and advantages of my invention. The appended claims have been drawn to cover all legitimate modifications and adaptations.

I claim:

1. In a floor grating construction for vehicles, a substantially horizontal metallic floor supporting a layer of compressible sound deadening and insulating material with carpeting overlying the same that is also of compressible material, a generally rectangular shallow pan of relatively rigid material resting on the first mentioned layer of sound deadening material when set in an opening provided therefor in the carpeting and having a marginal flange above the level of the bottom of the pan and overlying the carpeting, means securing said pan by its flange to said floor compressing said both of the aforementioned compressible materials so that the flange lies substantially flush with the top of said carpeting surrounding the same and dirt can be swept off it into the pan conveniently, shoe scraper grating means in said pan, and a structurally independent, generally rectangular, upwardly inclined toe-board panel of less depth than said pan and having a rear edge portion abutting the front edge portion of said pan, said toe-board panel overlying carpeting on an upwardly inclined toe-board portion of said floor and extending forwardly from the front of said pan and draining into said pan, said toe-board panel having shoe scraper means thereon, there being means for separately securing said toe-board panel to the toe-board portion of said floor.

2. A floor grating construction for vehicles as set forth in claim 1, wherein said toe-board panel has a rearwardly directed horizontal flange provided on the rear edge portion thereof for overlapping locating engagement on the front edge portion of the pan and resting thereon, so as to enable good drainage off the panel into said pan.

3. A floor grating construction for vehicles as set forth in claim 1, wherein the toe-board panel has side flanges, at least one of which is in fore and aft register with a side flange of the pan, said flanges being of appreciable width and having all but the marginal outer edge portion thereof provided with grooves extending in criss-cross relation to define anti-skid surfaces on the top thereof, the grooves serving to drain moisture into said pan.

4. In a floor grating construction for vehicles, a substantially horizontal metallic floor supporting a layer of compressible sound deadening and insulating material with carpeting overlying the same that is also of compressible material, a shallow pan of relatively rigid metallic material resting on the first mentioned layer of sound deadening material when set in an opening provided therefor in the carpeting and having a marginal flange above the level of the bottom of the pan and overlying the carpeting, means securing said pan by its flange to said floor compressing both of the aforementioned compressible materials so that the flange lies substantially flush with the top of said carpeting surrounding the same and dirt can be swept off it into the pan conveniently, and shoe scraper grating means in said pan, said flange being of appreciable width and having all but the marginal outer edge portion thereof provided with grooves extending in crisscross relation to define an anti-skid surface on the top thereof all around the pan, the grooves serving to drain moisture into said pan.

5. In a floor grating construction for vehicles, a substantially horizontal metallic floor supporting a layer of compressible sound deadening and insulating material with carpeting overlying the same that is also of compressible material, a shallow pan of relatively rigid metallic material resting on the first mentioned layer of sound deadening material when set in an opening provided therefor in the carpeting and having a marginal flange above the level of the bottom of the pan and overlying the carpeting, means securing said pan by its flange to said floor compressing both of the aforementioned compressible materials so that the flange lies substantially flush with the top of carpeting surrounding the same and dirt can be swept off it into the pan conveniently, and shoe scraper grating means in said pan, said shoe scraper grating means comprising spaced parallel ribs of metallic rigid construction in fixed relation to the pan, and elongated cleats of non-skid material secured to the tops of said ribs and extending lengthwise thereof, the cleats on each rib being in evenly longitudinally spaced relationship to one another and set in recesses provided in the tops of said ribs.

6. A floor grating construction for vehicles as set forth in claim 5, wherein the cleats set in said recesses in said ribs lie substantially flush with the tops thereof.

7. A floor grating construction for vehicles as set forth in claim 5, wherein, the cleats on neighboring ribs are disposed in staggered relationship to one another.

8. A floor grating construction for vehicles as set forth in claim 5, wherein the pan is of generally rectangular form and the shoe scraper ribs define troughs therebetween extending crosswise of the pan, the combination including, a heel rest pad of generally rectangular form disposed in one front corner of said pan secured to the adjacent cleat and disposed in one end of the front trough in said pan, the pad being integral with one of said cleats.

9. A floor grating construction for vehicles as set forth in claim 7, wherein, the ends of cleats in neighboring ribs being substantially in alignment with one another on lines at right angles to said ribs.

10. A floor grating construction for vehicles as set forth in claim 5, wherein, the cleats are of greater width than said ribs and have downwardly projecting flanges along the opposite sides thereof engaging the opposite sides of said ribs for improved drainage of dirt and water from the cleats into said pan and for better support of said cleats against displacement relative to said ribs.

11. A floor grating construction for vehicles as set forth in claim 5, wherein, said ribs are hollow and said cleats have lugs on the bottom thereof entered with a water-tight fit in slots provided therefor in said ribs.

References Cited by the Examiner

UNITED STATES PATENTS

| | | | |
|---|---|---|---|
| 1,728,306 | 9/1929 | Richardson | 180—90.6 |
| 2,657,948 | 11/1953 | Sturtevant | 180—90.6 X |
| 3,149,875 | 9/1964 | Stata | 296—1 |

BENJAMIN HERSH, *Primary Examiner.*

P. GOODMAN, *Assistant Examiner.*